(12) United States Patent
Krishnan et al.

(10) Patent No.: US 11,833,851 B2
(45) Date of Patent: Dec. 5, 2023

(54) MICROSPHERE ARTICLES AND TRANSFER ARTICLES

(71) Applicant: 3M INNOVATIVE PROPERTIES COMPANY, St. Paul, MN (US)

(72) Inventors: Vivek Krishnan, St. Paul, MN (US); John C. Clark, Maplewood, MN (US); Thomas B. Galush, Roseville, MN (US); Jean A. Tangeman, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/015,466

(22) Filed: Sep. 9, 2020

(65) Prior Publication Data

US 2020/0398608 A1    Dec. 24, 2020

Related U.S. Application Data

(63) Continuation of application No. 14/379,027, filed as application No. PCT/US2013/026781 on Feb. 20, 2013, now abandoned.

(Continued)

(51) Int. Cl.
*B44C 1/17* (2006.01)
*B32B 27/20* (2006.01)
(Continued)

(52) U.S. Cl.
CPC .............. *B44C 1/1737* (2013.01); *B32B 7/12* (2013.01); *B32B 27/02* (2013.01); *B32B 27/08* (2013.01);
(Continued)

(58) Field of Classification Search
CPC .............. C08K 7/20; C08K 7/28; G02B 5/128
See application file for complete search history.

(56) References Cited

U.S. PATENT DOCUMENTS

| 2,326,634 A | 8/1943 | Gebhard |
| 4,153,412 A * | 5/1979 | Bailey .................. B41M 5/035 428/323 |

(Continued)

FOREIGN PATENT DOCUMENTS

| CN | 1196126 | 10/1998 |
| EP | 0 683 403 | 11/1995 |

(Continued)

OTHER PUBLICATIONS

Burton et al. (Epoxy Formulations Using Jeffamine® Polyetheramines), Apr. 27, 2005 downloaded on Sep. 30, 2019 from http://www.huntsman.com/performance_products/Media%20Library/global/files/epoxy_formulations_usingjeffamine_polyetheramines.pdf (Year: 2005).

(Continued)

*Primary Examiner* — John Vincent Lawler
(74) *Attorney, Agent, or Firm* — Julie Lapos-Kuchar

(57) ABSTRACT

There is provided an article comprising at least a first surface having: (a) a first binder layer; (b) a plurality of transparent microspheres partially embedded in the first binder layer wherein the transparent microspheres have refractive indices that are less than a refractive index of the first binder layer and wherein the plurality of transparent microspheres consist of microspheres having a refractive index of no more than 1.490. There is also provided a transfer article comprising: (a) a transfer carrier, the transfer carrier comprising: (i) a support layer; and (ii) a thermoplastic release layer bonded to the support layer; (b) a layer of a plurality of transparent microspheres, formed on a side of the thermoplastic transparent microsphere release layer opposite the (Continued)

support layer, wherein the plurality of transparent microspheres consist of microspheres having a refractive index of no more than 1.490.

21 Claims, 1 Drawing Sheet

Related U.S. Application Data

(60) Provisional application No. 61/601,832, filed on Feb. 22, 2012.

(51) Int. Cl.
| | | |
|---|---|---|
| *B32B 7/12* | (2006.01) | |
| *B32B 27/14* | (2006.01) | |
| *B32B 27/02* | (2006.01) | |
| *B32B 27/08* | (2006.01) | |
| *G02B 5/128* | (2006.01) | |
| *B44C 3/02* | (2006.01) | |
| *B44C 1/10* | (2006.01) | |

(52) U.S. Cl.
CPC .............. *B32B 27/14* (2013.01); *B32B 27/20* (2013.01); *B44C 1/105* (2013.01); *B44C 3/02* (2013.01); *G02B 5/128* (2013.01); *B32B 2260/025* (2013.01); *B32B 2260/046* (2013.01); *B32B 2264/101* (2013.01); *B32B 2307/402* (2013.01); *B32B 2405/00* (2013.01); *B32B 2451/00* (2013.01); *B32B 2509/00* (2013.01); *Y10T 428/1405* (2015.01); *Y10T 428/24372* (2015.01); *Y10T 428/24405* (2015.01); *Y10T 428/24421* (2015.01); *Y10T 428/25* (2015.01)

(56) References Cited

U.S. PATENT DOCUMENTS

| | | | |
|---|---|---|---|
| 4,849,265 A | | 7/1989 | Ueda |
| 5,055,347 A | | 10/1991 | Bacon, Jr. |
| 5,270,433 A | | 12/1993 | Klauck |
| 5,620,775 A | | 4/1997 | LaPerre |
| 5,837,347 A | | 11/1998 | Marecki |
| 5,962,121 A | * | 10/1999 | Mori ..................... G02B 5/128 |
| | | | 428/323 |
| 6,060,157 A | | 5/2000 | LaPerre |
| 6,858,552 B2 | | 2/2005 | Peuchert |
| 7,153,797 B2 | | 12/2006 | Peuchert |
| 2001/0005282 A1 | | 6/2001 | Etori et al. |
| 2002/0109920 A1 | * | 8/2002 | Hannington ......... G02B 5/0268 |
| | | | 359/614 |
| 2003/0165666 A1 | * | 9/2003 | Fujiwara ................ G02B 5/128 |
| | | | 428/143 |
| 2005/0100709 A1 | * | 5/2005 | Bescup .................... E01F 9/524 |
| | | | 428/143 |
| 2006/0198020 A1 | | 9/2006 | Hannington |
| 2006/0274989 A1 | * | 12/2006 | Gergely ................... C03C 3/064 |
| | | | 385/12 |
| 2010/0221540 A1 | | 9/2010 | Hermann |

FOREIGN PATENT DOCUMENTS

| | | | |
|---|---|---|---|
| EP | 0 870 209 | | 1/2000 |
| JP | 11-514943 | | 12/1999 |
| JP | 2000-241609 | | 9/2000 |
| JP | 2001-242546 | | 9/2001 |
| JP | 2002-234752 | | 8/2002 |
| JP | 2007-039315 | | 2/2007 |
| JP | 2009-527443 | | 7/2009 |
| JP | 2010-251053 | | 11/2010 |
| WO | WO 97/10522 | | 3/1997 |
| WO | WO 97/16754 | | 5/1997 |
| WO | WO 2005/047604 | | 5/2005 |
| WO | WO 2011/022021 | | 2/2011 |
| WO | WO-2011123223 A1 * | 10/2011 | ......... C08G 18/6674 |

OTHER PUBLICATIONS

Dombrovsky et al., Infrared radiative properties of polymer coatings containing hollow microspheres, Nov. 7, 2006, International Journal of Heat and Mass Transfer 50, pp. 1516-1527.

Product List, MBX Series/MBX-8, Sekisui Plastics Co. Ltd., 5 pages.

Ruckebusch, Solar heat reflective paint & coatings using 3M™ Glass Bubbles, May 2011, Pitture E Vernici—European Coatings, vol. 87, No. 3, pp. 15-20 and front matter.

Sherman et al., Kirk-0th mer Concise Encyclopedia of Chemical Technology—Epoxy Resins entry, 1985, John Wiley & Sons, Inc., pp. 431-433. (Year: 1985).

Texloc Refractive Index of Polymers literature downloaded from http://www.texloc.com/closet/cl_refractiveindex.html on May 29, 2008.

* cited by examiner

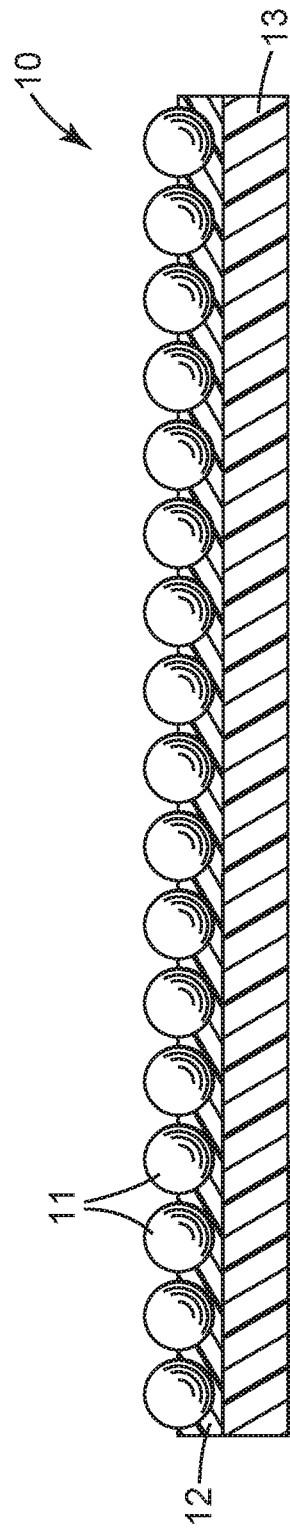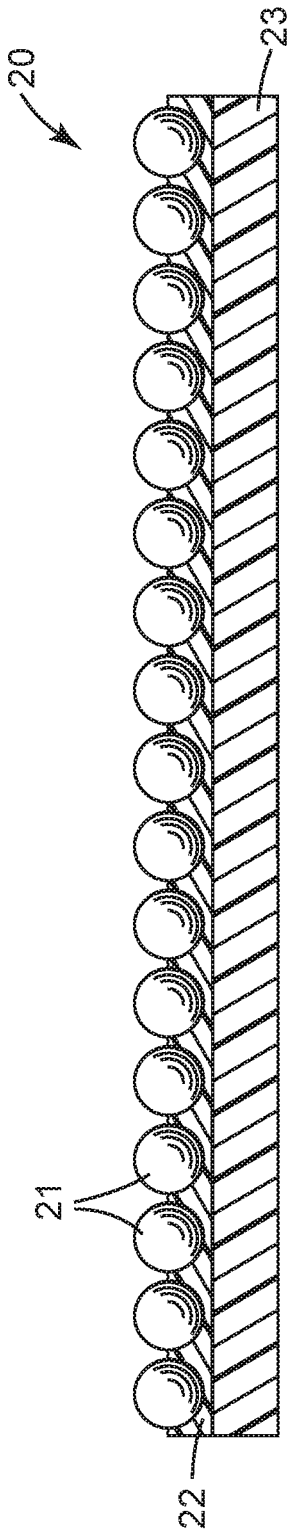

MICROSPHERE ARTICLES AND TRANSFER ARTICLES

CROSS REFERENCE TO RELATED APPLICATIONS

This application is a continuation of U.S. application Ser. No. 14/379,027, filed Aug. 15, 2014, which is a national stage filing under 35 U.S.C. 371 of PCT/US2013/026781, filed Feb. 20, 2013, which claims priority to U.S. Provisional Patent Application No. 61/601,832, filed Feb. 22, 2012, the disclosures of which are incorporated by reference in their entirety herein.

FIELD

This disclosure relates to articles and transfer articles that are coated with transparent microspheres.

BACKGROUND

Decorative protective surfaces find many consumer applications. Household appliances, automotive interiors and paints, consumer electronic devices, such as laptops and hand held devices, are all examples where consumers prefer materials that deliver considerable protection from scratches, wear and abrasion while retaining high cosmetics and aesthetics throughout the material's lifecycle. Low gloss matte surfaces are of particular interest to many consumers because of their aesthetic appeal.

Durable decorative laminates and films comprised of glass beads are broadly known. These low gloss constructions typically consist of exposed glass bead surfaces that impart high durability and decorative properties to the construction. Low friction properties of such constructions have also been disclosed. For example, U.S. Pat. No. 4,849,265 (Ueda) discloses decorative abrasion resistant laminates that contain hard microspheres (glass or plastic) that are either exposed or surface coated with a thin polymer coating. There is no disclosure about the influence of refractive index of the microspheres on the true color of the final laminate.

Known methods for providing true color in decorative materials include closely matching the refractive index of the individual components, so as to minimize reflections due to index mismatch. For example, U.S. Pat. No. 5,620,775 (LaPerre) discloses decorative articles comprising exposed glass bead surfaces. The disclosed construction has the appearance of an etched surface and a rainbow like optical appearance. There is no disclosure about adjusting the refractive index to get a more true color in the final article.

It is known that it is advantageous to select microspheres having a refractive index in a range that is close to that of commonly used polymer films in order to provide true color of the underlying pigmented polymer. For example, U.S. Pat. No. 5,620,775 (LaPerre) discloses durable, low coefficient of friction polymeric films made by having an exposed glass bead surface with glass beads having a refractive index in the range of about 1.5 to about 1.6, which is a refractive index range close to that of common polymers.

There is a need for microsphere coated articles and transfer articles that provide improvements in aesthetics, such as true color, while maintaining abrasion and wear resistance provided by conventional microsphere coated articles and transfer articles.

SUMMARY

The present disclosure provides low gloss polymeric films containing partially exposed transparent microspheres with improved aesthetics and a true color appearance. It has been surprisingly found that in the case of a transparent microsphere multilayer film, by increasing the mismatch in refractive index between a plurality of transparent microspheres and a binder layer, the color of the underlying layers, such as the binder layer and other substrates, is brought out better. It has been surprisingly observed that, particularly in the case of dark color pigmented articles, the true color of the underlying binder layer and/or other substrates is improved when selecting a plurality of transparent microspheres having a lower refractive index than that of the binder layer. In some embodiments, it has been surprisingly found that the true color of the underlying binder layer and/or other substrates is improved when selecting a plurality of transparent microspheres having a refractive index of less than about 1.490.

In one aspect, the present disclosure provides an article comprising at least a first surface having: (a) a first binder layer; (b) a plurality of transparent microspheres at least partially embedded in the first binder layer; wherein the transparent microspheres have refractive indices that are less than a refractive index of the first binder layer, wherein the plurality of transparent microspheres have an average diameter of at least 5 µm. In some embodiments, the plurality of transparent microspheres has a refractive index of less than 1.490. In some embodiments, the plurality of transparent microspheres are selected from at least one of glass, polymers, glass ceramics and ceramics. In some embodiments, the first binder layer is selected from at least one of polyurethanes, polyesters, acrylic and methacrylic acid ester polymers and copolymers, epoxies, polyvinyl chloride polymers and copolymers, polyvinyl acetate polymers and copolymers, polyamide polymers and copolymers, fluorine containing polymers and copolymers, silicones, silicone containing copolymers, elastomers, including synthetic and natural rubbers such as neoprene, acrylonitrile butadiene copolymers, metals, glass, ceramics, polymer matrix composites, and combinations thereof. In some embodiments, the first binder layer is an adhesive.

In some embodiments, the plurality of transparent microspheres have an average diameter of no greater than 200 µm. In some embodiments, up to about 91% of the surface of the article is covered with the plurality of transparent microspheres. In some embodiments, at least one of the article or the binder layer comprises a pigment. In some embodiments, the plurality of transparent microspheres are partially embedded in the first binder layer such that about 20% to about 70% of the average diameter of the transparent microspheres is exposed.

In some embodiments, the plurality of transparent microspheres have a multi-modal size distribution. In some embodiments, the article is at least one of a decorative film, a protective film, a transfer article. In some embodiments, the article further comprises one or more layers selected from the group consisting of substrate layers, adhesive layers, colored polymeric layers, and release layers bonded to the article on a side of the first binder layer opposite the plurality of transparent microspheres, wherein any of said layers can optionally have a graphic design therein. In some embodiments, the substrate layer may be from at least one of fabrics, polymer coated fabrics, leather, metal, paint coated metal, elastomers, paper, polymer matrix composites, and polymeric materials. In some embodiments, the transparent microspheres are treated with an adhesion promoter. In some embodiments, the first binder layer is transparent.

In another aspect, the present disclosure provides a transfer article comprising: (a) a transfer carrier, the transfer carrier comprising: (i) a support layer; and (ii) a thermoplastic release layer bonded to the support layer; (b) a layer of a plurality of transparent microspheres, formed on a side of the thermoplastic transparent microsphere release layer opposite the support layer, wherein the plurality of transparent microspheres have refractive indices of below about 1.490. In some embodiments, the transfer articles further comprises (c) a binder layer on a side of the plurality of transparent microspheres that is opposite the thermoplastic release layer.

In some embodiments, the plurality of transparent microspheres are selected from at least one of glass, polymers, glass ceramics and ceramics.

In some embodiments, the first binder layer is selected from at least one of polyurethanes, polyesters, acrylic and methacrylic acid ester polymers and copolymers, epoxies, polyvinyl chloride polymers and copolymers, polyvinyl acetate polymers and copolymers, polyamide polymers and copolymers, fluorine containing polymers and copolymers, silicones, silicone containing copolymers, elastomers, including synthetic and natural rubbers such as neoprene, acrylonitrile butadiene copolymers, metals, glass, ceramics, polymer matrix composites, and combinations thereof. In some embodiments, the first binder layer is an adhesive.

In some embodiments, the plurality of transparent microspheres have an average diameter of no greater than 200 µm. In some embodiments, up to about 91% of the surface of the article is covered with the plurality of transparent microspheres. In some embodiments, at least one of the transfer article or the binder layer comprises a pigment. In some embodiments, the microsphere article further comprises a colored layer opposite the surface comprising the embedded microspheres. In one embodiment, the colored layer is a graphic print applied to the backside of the microsphere article.

In some embodiments, the plurality of transparent microspheres are partially embedded in the first binder layer such that about 20% to about 70% of the average diameter of the transparent microspheres is exposed. In some embodiments, the plurality of transparent microspheres has a multi-modal size distribution. In some embodiments, the transfer article further comprises at least one layer selected from at least one of substrate layers, adhesive layers, colored polymeric layers, and release layers bonded to the article on a side of the first binder layer opposite the plurality of transparent microspheres, wherein any of said layers can optionally have a graphic design therein.

In some embodiments, the substrate layer from at least one of fabrics, polymer coated fabrics, leather, metal, paint coated metal, elastomers, paper, polymer matrix composites, and polymeric materials. In some embodiments, the transparent microspheres are treated with an adhesion promoter. In some embodiments, the first binder layer is discontinuous and wherein the binder layer is capable of bonding to a substrate layer.

The above summary of the present disclosure is not intended to describe each embodiment of the present invention. The details of one or more embodiments of the invention are also set forth in the description below. Other features, objects, and advantages of the invention will be apparent from the description and from the claims.

BRIEF DESCRIPTION OF THE DRAWINGS

FIG. 1 is a cross-section one embodiment of an article of the present disclosure; and FIG. 2 is a cross-section of one embodiment of a transfer article of the present disclosure.

DETAILED DESCRIPTION

Before any embodiments of the invention are explained in detail, it is to be understood that the invention is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated. These are only examples of what is specifically intended, and all possible combinations of numerical values between and including the lowest value and the highest value enumerated are to be considered to be expressly stated in this application.

Transfer Carrier

The transfer coating method of the present disclosure can be used to form the presently disclosed microsphere transfer article from which can be formed the presently disclosed microsphere article. The microsphere article has surprisingly improved aesthetics.

The presently disclosed transfer carrier includes a support layer and a thermoplastic release layer bonded thereto. The thermoplastic release layer of the transfer carrier temporarily partially embeds a plurality of transparent microspheres. In one embodiment, the plurality of transparent microspheres are embedded about at least 5%, 10%, 20%, 30%, 40%, or even 50%, and no more than 60%, 70% or even 80% of the transparent microsphere diameter into the thermoplastic release layer. The transfer carrier has low adhesion to the plurality of transparent microspheres and to the binder layer in which the opposite sides of the plurality of transparent microspheres are at least partially embedded, so that the transfer carrier can be removed to expose the surface of the plurality of transparent microspheres.

Because the microsphere articles of the present disclosure are constructed wherein at one point the transparent microspheres are embedded in both a thermoplastic release layer and a binder layer, when the thermoplastic release layer is removed, the transparent microspheres are partially embedded in the binder layer. This means that the plurality of transparent microspheres are embedded about at least 20%, 30%, or even 40% and at most 60%, 70%, 80%, 90%, or even 95% of the transparent microsphere diameter into the binder layer.

Support Layer

The support layer should be "dimensionally stable". In other words it should not shrink, expand, phase change, etc. during the preparation of the transfer article. Useful support layers may be thermoplastic, non-thermoplastic or thermosetting, for example. One skilled in the art would be able to select a useful support layer for the presently disclosed transfer article. If the support layer is a thermoplastic layer it should preferably have a melting point above that of the thermoplastic release layer of the transfer carrier. Useful support layers for forming the transfer carrier include but are not limited to those selected from at least one of paper and polymeric films such as biaxially oriented polyethylene terephthalate (PET), polypropylene, polymethylpentene and the like which exhibit good temperature stability and tensile so they can undergo processing operations such as bead coating, adhesive coating, drying, printing, and the like.

Thermoplastic Release Layers

Useful thermoplastic release layers for forming the transfer carrier include but are not limited to those selected from at least one of polyolefins such as polyethylene, polypropylene, organic waxes, blends thereof, and the like. Low to medium density (about 0.910 to 0.940 g/cc density) polyethylene is preferred because it has a melting point high enough to accommodate subsequent coating and drying operations which may be involved in preparing the transfer article, and also because it releases from a range of adhesive materials which may be used as the binder layer, in addition to the plurality of transparent microspheres.

The thickness of the thermoplastic release layer is chosen according to the microsphere diameter distribution to be coated. The binder layer embedment becomes approximately the mirror image of the transfer carrier embedment. For example, a transparent microsphere which is embedded to about 30% of its diameter in the release layer of the transfer carrier is typically embedded to about 70% of its diameter in the binder layer. To maximize slipperiness and packing density of the plurality of microspheres, it is desirable to control the embedment process so that the upper surface of smaller microspheres and larger microspheres in a given population of the exposed microspheres are approximately the same height after the transfer carrier is removed.

In order to partially embed the plurality of transparent microspheres in the release layer, the release layer should preferably be in a tacky state (either inherently tacky and/or by heating). The plurality of transparent microspheres may be partially embedded, for example, by coating a plurality of transparent microspheres on the thermoplastic release layer of the transfer carrier followed by one of (1)-(3):(1) heating the microsphere coated transfer carrier, (2) applying pressure to the microsphere coated transfer carrier (with, for example, a roller) or (3) heating and applying pressure to the microsphere coated transfer carrier.

For a given thermoplastic release layer, the microsphere embedment process is controlled primarily by temperature, time of heating and thickness of the thermoplastic release layer. As the thermoplastic release layer is melted, the smaller microspheres in any given population will embed at a faster rate and to a greater extent than the larger microspheres because of surface wetting forces. The interface of the thermoplastic release layer with the support layer becomes an embedment bounding surface since the microspheres will sink until they are stopped by the dimensionally stable support layer. For this reason it is preferable that this interface be relatively flat.

The thickness of the thermoplastic release layer should be chosen to prevent encapsulation of most of the smaller diameter microspheres so that they will not be pulled away from the binder layer when the transfer carrier is removed. On the other hand, the thermoplastic release layer must be thick enough so that the larger microspheres in the plurality of transparent microspheres are sufficiently embedded to prevent their loss during subsequent processing operations (such as coating with the binder layer, for example). In one embodiment, the thickness of the thermoplastic release layer is at least 2.5 microns, 10 microns, 25 microns, or even 50 microns. In one embodiment, the thickness of the thermoplastic release layer is at most 75 microns, 100 microns, or even 150 microns.

Low Refractive Index Transparent Microspheres

The terms "transparent microspheres" and "microspheres" are used interchangeably herein.

The transparent microspheres useful in the present disclosure can be made using any material having a refractive index lower than the material used in the binder layer. In some embodiments, the transparent microspheres have a refractive index of no more than about 1.490. In some embodiments, the transparent microspheres have a refractive index of no more than about 1.480. In some embodiments, the transparent microspheres have a refractive index of no more than about 1.470. In some embodiments, the transparent microspheres have a refractive index of no more than about 1.460. In some embodiments, the transparent microspheres have a refractive index of no more than about 1.450. In some embodiments, the transparent microspheres have a refractive index of no more than about 1.400. Typically, the transparent microspheres have a refractive index of more than 1.00.

In some embodiments, the transparent microspheres are glass beads. The glass beads are largely spherically shaped. The glass beads are typically made by from ordinary soda-lime glass or borosilicate glass, typically from recycled sources such as from glassware. Common industrial glasses could be of varying refractive indices depending on their composition. Soda lime silicates and borosilicates are some of the common types of glasses. Borosilicate glasses typically contain boria and silica along with other elemental oxides such as alkali metal oxides, alumina etc. Some glasses used in the industry that contain boria and silica among other oxides include E glass which has a refractive index close to 1.57; glass available under the trade designation "NEXTERION GLASS D" from Schott Industries, Kansas City, Missouri, which has a refractive index of 1.52; and glass available under the trade designation "PYREX" from Corning Incorporated, New York, New York, which has a refractive index around 1.47. In one embodiment, the transparent microspheres comprise at least 5%, 10%, or even 12% boron oxide by weight.

The grinding process yields a wide distribution of glass particle sizes. The glass particles are spherodized by treating in a heated column to melt the glass into spherical droplets, which are subsequently cooled. Not all the beads are perfect spheres. Some are oblate, some are melted together and some contain small bubbles.

Microspheres are preferably free of defects. As used herein, the phrase "free of defects" means that the microspheres have low amounts of bubble type defects, low amounts of irregular shaped particles, low amount of inhomogenieties, or low amounts undesirable of color or tint. Typically, materials that have at least 70% (by count) defect free microspheres may be preferred. In some embodiments of the present disclosure, materials that have at least 75%, 80%, 85%, 90% or even 99% defect free microspheres may be preferred. Materials that have less than 75% defect free microspheres are not desirable for aesthetic purposes.

Particle Sizing

The transparent microspheres are typically sized via screen sieves to provide a useful distribution of particle sizes. Sieving is also used to characterize the size of the transparent microspheres. With sieving, a series of screens with controlled sized openings is used and the microspheres passing through the openings are assumed to be equal to or smaller than that opening size. For microspheres, this is true because the cross-sectional diameter of the microsphere is almost always the same no matter how it is oriented to a screen opening. It is desirable to use as broad a size range as possible to control economics and maximize the packing of the microspheres on the binder layer surface. However, some applications may require limiting the microsphere size range to provide a more uniform microsphere coated surface. In some embodiments, a useful range of average microsphere diameters is about 5 µm to about 200 µm (typically about 35 to about 140 µm, preferably about 35 to 90 µm, and most preferably about 38 to about 75 µm). A small number (0 to 5% by weight based on the total number of microspheres) of smaller and larger microspheres falling outside the 20 to 180 micron range can be tolerated. In some embodiments, a multi-modal size distribution of microspheres is useful. For example, in a bi-modal distribution two distinct peaks in the population density of the microspheres are observed.

In some embodiments, to calculate the "average diameter" of a mixture of microspheres one would sieve a given weight of particles such as, for example, a 100 gram sample through a stack of standard sieves. The uppermost sieve would have the largest rated opening and the lowest sieve would have the smallest rated opening. For our purpose, the average cross-sectional diameter can be effectively measure by using the following stack of sieves.
U.S. Sieve Designation No.
Nominal Opening (microns).

| | |
|---|---|
| 80 | 180 |
| 100 | 150 |
| 120 | 125 |
| 140 | 106 |
| 170 | 90 |
| 200 | 75 |
| 230 | 63 |
| 270 | 53 |
| 325 | 45 |
| 400 | 38 |
| 500 | 25 |
| 635 | 20 |

Alternately, average diameter can be determined using any commonly known microscopic methods for sizing particles. For example, optical microscopy or scanning electron microscopy, and the like, can be used in combination with any image analysis software. For example, software commercially available as free ware under the trade designation "IMAGE J" from NIH, Bethesda, Maryland
Adhesion Promoter In some embodiments, the transparent microspheres are treated with an adhesion promoter such as those selected from at least one of silane coupling agents, titanates, zirconates, organo-chromium complexes, and the like, to maximize their adhesion to the binder layer, especially with regard to moisture resistance.

The treatment level for such adhesion promoters is on the order of 50 to 1200 parts by weight adhesion promoter per million parts by weight microspheres. Microspheres having smaller diameters would typically be treated at higher levels because of their higher surface area. Treatment is typically accomplished by spray drying or wet mixing a dilute solution such as an alcohol solution (such as ethyl or isopropyl alcohol, for example) of the adhesion promoter with the microspheres, followed by drying in a tumbler or auger-fed dryer to prevent the microspheres from sticking together. One skilled in the art would be able to determine how to best treat the microspheres with an adhesion promoter.

Binder Layer

The binder layer (also referred to as the "first binder layer") is typically an organic polymeric material. It should exhibit good adhesion to the transparent microspheres themselves or to the treated microspheres. It is also possible that an adhesion promoter for the transparent microspheres could be added directly to the binder layer itself as long as it is compatible within the process window for disposing the binder layer on the surfaces of the transparent microspheres. It is important that the binder layer has sufficient release from the thermoplastic release layer of the transfer carrier to allow removal of the transfer carrier from the transparent microspheres, which are embedded on one side in the thermoplastic release layer and on the other side in the binder layer.

Binders useful in the binder layer include, but are not limited to those selected from at least one of polyurethanes, polyesters, acrylic and methacrylic acid ester polymers and copolymers, epoxies, polyvinyl chloride polymers and copolymers, polyvinyl acetate polymers and copolymers, polyamide polymers and copolymers, fluorine containing polymers and copolymers, silicones, silicone containing copolymers, elastomers, including synthetic and natural rubbers such as neoprene, acrylonitrile butadiene copolymers, metals, glass, ceramics, polymer matrix composites, and combinations thereof. In some embodiments, the polymer matrix composites include nanoparticles in resins, fibers in resins, and the like. Combinations can include any combinations of materials, such as interpenetrating networks, dual cure systems, and the like.

In some embodiments, the refractive index of the binder is greater than 1.50, 1.52, 1.55, or even 1.6. In some embodiments, the refractive index of the binder layer is no more than 1.35, 1.38, 1.40 or even 1.45.

The binder layer can be formed, for example, out of solution, aqueous dispersion, or 100% solids coating such as via hot melt or extrusion. The binder layer may be transparent, translucent, or opaque. It may be colored or colorless. The binder layer may, for example, be clear and colorless or pigmented with opaque, transparent, or translucent dyes and/or pigments. In some embodiments, inclusion of specialty pigments, such as for example metallic flake pigments, can be useful.

In one embodiment, the thickness of the binder layer is at least 50% of the average diameter of the transparent microspheres. For example, 10, 25, 50, 100, or even 250 µm (micrometers) or even more (e.g., at least 1 millimeter, at least 1 centimeter, or even 1 meter).

If retroreflective performance is desired in at least a portion of the surface layer of the presently disclosed microsphere coated article, such that a reflecting layer (such as a thin metallic layer such as an aluminum flake ink layer, for example) is coated on the buried (non-exposed) side of the transparent microspheres, it is preferred that the binder layer be transparent and thin such that it maintains the contours of the transparent microspheres, so that it can also function as a spacing layer to focus the incident light on the reflecting layer placed below it.

The binder layer is typically formed on the transfer carrier after the transparent microspheres have been partially embedded in the release layer of the transfer carrier. The binder layer is typically coated over the partially embedded transparent microspheres by a direct coating process but could also be provided over the transparent microspheres via thermal lamination either from a separate carrier or by first forming the binder layer on a separate substrate from which it is subsequently transferred to cover the transparent microspheres.

In one embodiment, the present disclosure enables a more true color of the article. In other words, the constructions of the present disclosure enable a minimizing the perceived brightness/lightness of the article when viewed through the transparent microspheres.

In the CIELAB color space, $L^*$ is the measure of lightness or brightness of a colored surface (for example $L^*$ of pure black is typically 0 and $L^*$ of diffuse white is 100). Although not wanting to be limited by theory, it is believed that surfaces comprising components that reflect a fraction of broad spectrum light (e.g., microspheres) in addition to components that selectively absorb or reflect certain colors (e.g., pigments or dyes) are typically less saturated due to the increase in $L^*$ associated with the reflected broad spectrum light. It is typically desirable in colored articles to lower the fraction of reflected broad spectrum light so that the true color of the article is observed. For example, in articles where there is a stronger front surface reflection due to the higher refractive index of the microsphere, the observed color of the article could typically appear less saturated (i.e., a "washed out" appearance).

In the present disclosure, the refractive index of the transparent microspheres are selected such that they have a refractive index that is less than the refractive index of the binder to enable true color of the underlying layers. In some embodiments of the present disclosure the difference is at least 0.15, 0.02 or even 0.03. In some embodiments of the present disclosure, this difference in the refractive index is at most 0.50, 0.20, 0.15, 0.08, or even 0.04.

Substrate Layers

The presently disclosed microsphere coated articles and transfer articles can optionally comprise one or more substrate layer(s). Examples of suitable substrate layers include but are not limited to those selected from at least one of fabrics (including synthetics, non-synthetics, woven and non-woven such as nylon, polyester, etc.), polymer coated fabrics such as vinyl coated fabrics, polyurethane coated fabrics, etc.; leather; metal; paint coated metal; paper; polymeric films or sheets such as polyethylene terephthalate, acrylics, polycarbonate, polyurethane, elastomers including natural and synthetic rubber such as neoprene, and the like. The substrates may, for example, be in the form of a clothing article; automobile, marine, or other vehicle seat coverings; automobile, marine, or other vehicle bodies; orthopedic devices; electronic devices, hand held devices, household appliances, and the like.

In the presently disclosed transfer and microsphere coated articles, the plurality of transparent microspheres are typically provided as a continuous layer in some embodiments or in some embodiments as a discontinuous layer (e.g., patterned). The binder layer is continuous in some embodiments or discontinuous in some embodiments. The substrate adhesive, when present, may be continuous in some embodiments or discontinuous in some embodiments. Typically, the substrate layer, when present, is continuous, although it may be discontinuous. In the presently disclosed microsphere coated articles all layers can optionally be continuous or discontinuous (e.g., patterned).

Graphic Layer Options

The present disclosed binder layer can optionally also perform the function of acting as the adhesive for a desired substrate and/or further comprise pigment(s) such that it also has a graphic function.

The binder layer, when selected to function also as a substrate adhesive, may be, for example, pigmented and provided in the form of an image, such as, for example, by screen printing the adhesive in the form of a graphic for transfer to a separate substrate. However, the binder layer, in some instances, is preferably colorless and transparent so that it can allow transmission of color from either a substrate, separate graphic layers (discontinuous colored polymeric layers) placed below it, or from a separate substrate adhesive that is optionally colored and optionally printed in the form of a graphic image (a discontinuous layer).

Typically, if a graphic image is desired it is provided separately on the surface of the binder layer opposite the plurality of embedded transparent microspheres by at least one colored polymeric layer. The optional colored polymeric layer may, for example, comprise an ink. Examples of suitable inks for use in the present disclosure include but are not limited to those selected from at least one of pigmented vinyl polymers and vinyl copolymers, acrylic and methacrylic copolymers, urethane polymers and copolymers, copolymers of ethylene with acrylic acid, methacrylic acid and their metallic salts, and blends thereof. The colored polymeric layer, which can be an ink, can be printed via a range of methods including, but not limited to screen printing, flexographic printing, offset printing, lithography, transfer electrophotography, transfer foil, and direct or transfer xerography. The colored polymeric layer may be transparent, opaque, or translucent.

If retroreflective performance is desired, the colored polymeric layer or multiple colored polymeric layers should be thin enough to maintain the contour of the plurality of transparent microspheres. The last underlying layer should be a reflecting layer such as a polymeric layer containing nascent reflecting particles such as aluminum flake or a metallic layer such as vapor deposited aluminum. The resultant graphic image could be a combination of individual retroreflective and non-retroreflective images when opaque colored polymeric layers are printed in some areas and reflecting colored polymeric layers are printed in other areas. The graphic could encompass a broad range of color, especially if a 4-color graphic process is employed.

A colored polymeric layer(s) may be included in the articles of the present disclosure by a number of procedures. For example, a transfer carrier can have a layer of transparent microspheres embedded in the release layer thereof, following which the microsphere embedded surface of the release layer is coated with a transparent layer of binder. This microsphere and adhesive coated transfer carrier can function as a casting liner by coating, for example, a continuous colored plasticized vinyl layer over the binder layer and wet laminating a woven or non-woven fabric thereover.

Another method involves providing graphic layers (discontinuous colored polymeric layers, for example) on the binder layer prior to casting a continuous colored plasticized vinyl layer to approximate the image of leather, for example.

Optional Adhesive Layer(s)

The presently disclosed microsphere coated article and transfer article may each optionally further comprise one or more adhesive layers in addition to the binder layer. A substrate adhesive layer, for example, may optionally be included in the article in order to provide a means for bonding the binder layer or the layer(s) of material optionally bonded to the binder layers to a substrate. These optional adhesive layer(s) may be optionally present when, for example, the binder layer cannot function also as an adhesive for a desired substrate. A substrate adhesive layer (as well as any other optional adhesive layers) may comprise the same general types of polymeric materials used for the binder layer and may be applied following the same general procedures. However, each adhesive layer used must be selected such that it will adhere the desired layers together. For example, a substrate adhesive layer must be selected such that it can adhere to an intended substrate as well as to the other layer to which it is bonded.

Reinforcing Layer(s)

Optional layers may be included in the presently disclosed microsphere coated article and transfer article to, for example, enhance the ability to separate the transfer carrier from the layer of a plurality of transparent microsphere. Such an optional layer which in such an article can function as a reinforcing layer would typically be positioned in between the plurality of transparent microspheres and a substrate adhesive layer. Examples of useful reinforcing layers would include additional substrate layer(s), for example.

A transparent microsphere coated and adhesive coated transfer carrier could be coated with a fabric adhesive such as a polyester, or a polyamide, followed by lamination to a woven fabric or to a moisture transmitting membrane, to function as a slippery liner for clothing, for example.

Embossing

The articles of the present disclosure may optionally be embossed. The embossing procedure would typically involve subjecting the article, bonded to an embossable substrate, and with the transfer carrier removed, to heat and pressure such as by a heated patterned roller assembly or a patterned heated platen press. For embossed articles it is preferable that the binder layer not be melted during the embossing operation, to preserve the microsphere embedment level, while at the same time flexible enough to be deformed without cracking. Another method of embossing would be to thermally laminate the transfer article to an irregular substrate such as, for example a coarse fabric such that after the transfer carrier is removed, that the surface is conformed to the irregular layer below it. In some embodiments, thermoforming can be used when processing the presently disclosed articles and transfer articles.

Referring now to FIG. 1, there is a cross-section, an embodiment of the presently disclosed article 10, wherein a plurality of transparent microspheres 11 have been operable affixed to one or more layers, such as for example a substrate layer 13. Article 10 includes a layer of a plurality of transparent microspheres 11 that have been electrostatically sprayed on the surface of a binder layer 12 while it was in a tacky state. In some embodiments, the transparent microspheres are embedded in the binder layer to a level between 30% to 40% of the diameter of the microspheres.

In some embodiments, the plurality of transparent microspheres 11 are selected to have a refractive index that is lower than the refractive index of the binder layer 12. In some embodiments, the transparent microspheres have a refractive index of less than about 1.490. In some embodiments, the plurality of transparent microspheres 11 have a refractive index of less than about 1.480. In some embodiments, the plurality transparent microspheres 11 have a refractive index of less than about 1.470. In some embodiments, the plurality of transparent microspheres 11 have a refractive index of less than about 1.46. In some embodiments, the plurality of transparent microspheres 11 have a refractive index of less than about 1.45. In some embodiments, the plurality of transparent microspheres 11 have a refractive index of less than about 1.40. In some embodiments, the plurality of transparent microspheres 11 have a refractive index of less than about 1.35 or less.

In some embodiments, the binder layer 12 is disposed on a substrate layer 13. In some embodiments, a pressure-sensitive adhesive layer can be disposed on a side of the substrate layer 13 opposite the side which is bonded to binder layer 12. In some embodiments, the pressure-sensitive adhesive layer is protected by a removable release liner. In some embodiments, article 10 is suitable for lamination to another substrate (not shown).

FIG. 2 is a cross-section of an embodiment of the presently disclosed transfer article 20, comprising a transfer carrier comprising temporary support layer 23 bonded to thermoplastic release layer 22. A layer of a plurality of transparent microspheres 21 are temporarily embedded in roughly a one-half state in thermoplastic release layer 22. In some embodiments, the transparent microspheres are embedded in the thermoplastic release layer to a level between 30% to 40% of the diameter of the microspheres. Support layer 23 is positioned against thermoplastic release layer 22. The transfer article 20 may be used by removing support layer 23 to expose thermoplastic release layer 22. Thermoplastic release layer 22 can then be attached to a substrate (not shown).

A non-limiting list of exemplary embodiments and combinations of exemplary embodiments of the present disclosure are disclosed below:

Embodiment 1. An article comprising at least a first surface having: (a) a first binder layer; (b) a plurality of transparent microspheres at least partially embedded in the first binder layer; wherein the transparent microspheres have refractive indices that are less than a refractive index of the first binder layer, wherein the plurality of transparent microspheres have an average diameter of at least 5 μm.

Embodiment 2. The article of embodiment 1 wherein the plurality of transparent microspheres have a refractive index of no more than 1.490.

Embodiment 3. The article of any of the preceding embodiments wherein the plurality of transparent microspheres are selected from at least one of glass, polymers, glass ceramics and ceramics.

Embodiment 4. The article of any of the preceding embodiments wherein the first binder layer is selected from at least one of polyurethanes, polyesters, acrylic and methacrylic acid ester polymers and copolymers, epoxies, polyvinyl chloride polymers and copolymers, polyvinyl acetate polymers and copolymers, polyamide polymers and copolymers, fluorine containing polymers and copolymers, silicones, silicone containing copolymers, elastomers, such as neoprene, acrylonitrile butadiene copolymers, metals, glass, ceramics, polymer matrix composites, and combinations thereof.

Embodiment 5. The article of any of the preceding embodiments where in the first binder layer is an adhesive.

Embodiment 6. The article of any of the preceding embodiments wherein the plurality of transparent microspheres have an average diameter of no greater than 200 μm.

Embodiment 7. The article of any of the preceding embodiments wherein up to about 91% of the surface of the article is covered with the plurality of transparent microspheres.

Embodiment 8. The article of any of the preceding embodiments wherein at least one of the article or the binder layer comprises a pigment.

Embodiment 9. The article of any of the preceding embodiments wherein the plurality of transparent microspheres are partially embedded in the first binder layer such that about 20% to about 70% of the average diameter of the transparent microspheres is exposed.

Embodiment 10. The article of any of the preceding embodiments wherein the plurality of transparent microspheres have a multi-modal size distribution.

Embodiment 11. The article of any of the preceding embodiments wherein the article is at least one of a decorative film, a protective film, a transfer article.

Embodiment 12. The article of any of the preceding embodiments which further comprises one or more layers selected from the group consisting of substrate layers, adhesive layers, colored polymeric layers, and release layers bonded to the article on a side of the first binder layer opposite the plurality of transparent microspheres, wherein any of said layers can optionally have a graphic design therein.

Embodiment 13. The article of embodiment 12 wherein the substrate layer from at least one of fabrics, polymer coated fabrics, leather, metal, paint coated metal, elastomers, paper, polymer matrix composites, and polymeric materials.

Embodiment 14. The article of any of the preceding embodiments wherein the transparent microspheres are treated with an adhesion promoter.

Embodiment 15. The article of any of the preceding embodiments wherein the first binder layer is transparent.

Embodiment 16. A transfer article comprising: (a) a transfer carrier, the transfer carrier comprising: (i) a support layer; and (ii) a thermoplastic release layer bonded to the support layer; (b) a layer of a plurality of transparent microspheres, formed on a side of the thermoplastic transparent microsphere release layer opposite the support layer, wherein the plurality of transparent microspheres have refractive indices of no more than 1.490.

Embodiment 17. The transfer article of embodiment 16 further comprising (c) a binder layer on a side of the plurality of transparent microspheres that is opposite the thermoplastic release layer.

Embodiment 18. The transfer article of any of embodiments 16 to 17 wherein the plurality of transparent microspheres are selected from at least one of glass, polymers, glass ceramics and ceramics.

Embodiment 19. The transfer article of any of embodiments 17 to 18 wherein the first binder layer is selected from at least one of polyurethanes, polyesters, acrylic and methacrylic acid ester polymers and copolymers, epoxies, polyvinyl chloride polymers and copolymers, polyvinyl acetate polymers and copolymers, polyamide polymers and copolymers, fluorine containing polymers and copolymers, silicones, silicone containing copolymers, elastomers, such as neoprene, acrylonitrile butadiene copolymers, metals, glass, ceramics, polymer matrix composites, and combinations thereof.

Embodiment 20. The transfer article of any of embodiments 17 to 19 where in the first binder layer is an adhesive.

Embodiment 21. The transfer article of any of embodiments 16 to 20 wherein the plurality of transparent microspheres have an average diameter of no greater than 200 μm.

Embodiment 22. The transfer article of any of embodiments 16 to 21 wherein up to about 91% of the surface of the article is covered with the plurality of transparent microspheres.

Embodiment 23. The transfer article of any of embodiments 17 to 22 wherein at least one of the transfer article or the binder layer comprises a pigment.

Embodiment 24. The transfer article of any of embodiments 17 to 23 wherein the plurality of transparent microspheres are partially embedded in the first binder layer such that about 20% to about 70% of the average diameter of the transparent microspheres is exposed.

Embodiment 25. The transfer article of any of embodiments 16 to 24 wherein the plurality of transparent microspheres has a multi-modal size distribution.

Embodiment 26. The transfer article of any of embodiments 16 to 25 further comprising at least one layer selected from at least one of substrate layers, adhesive layers, colored polymeric layers, and release layers bonded to the article on a side of the first binder layer opposite the plurality of transparent microspheres, wherein any of said layers can optionally have a graphic design therein.

Embodiment 27. The transfer article of embodiment 26 wherein the substrate layer from at least one of fabrics, polymer coated fabrics, leather, metal, paint coated metal, elastomers, paper, polymer matrix composites, and polymeric materials.

Embodiment 28. The transfer article of any embodiments 16 to 27 wherein the transparent microspheres are treated with an adhesion promoter.

Embodiment 29. The transfer article of any of embodiments 17 to 28 wherein the first binder layer is discontinuous (e.g., a pattern) and wherein the binder layer is capable of bonding to a substrate layer.

Embodiment 30. The transfer article of any of embodiments 16-29 wherein transparent microspheres in the plurality of transparent microspheres comprise at least 5% by weight of boron oxide.

Embodiment 31. The transfer article of any of embodiments 16-30 wherein the difference between the refractive index of a binder in the first binder layer and the refractive index of the transparent microspheres is at least 0.015.

Embodiment 32. The article of any of embodiments 1-15 wherein transparent microspheres in the plurality of transparent microspheres comprise at least 5% by weight of boron oxide.

Embodiment 33. The article of any of embodiments 1-15 or embodiment 32 wherein the difference between the refractive index of a binder in the first binder layer and the refractive index of the transparent microspheres is at least 0.015.

Embodiment 34. The article of any of embodiments 1-15 or embodiments 32-33, wherein the article further comprises a second layer opposite the first surface comprising the plurality of transparent microspheres at least partially embedded in the first binder layer, wherein the second layer is colored.

Various modifications and alterations of this invention will become apparent to those skilled in the art without departing from the scope and spirit of this invention.

EXAMPLES

Materials

| Designation | Description |
| --- | --- |
| K-FLEX 188 | 100% active polyester polyol obtained from King Industries. Inc., Nowalk, CT |
| DESMODUR N3300A | solvent free polyfunctional aliphatic isocyanate resin based on hexamethylenediisocyanate, obtained from Bayer Materials Science, Pittsburgh, PA |
| K-KAT XC-9213 | zirconium chelate complex obtained from King Industries, Inc., Nowalk, CT |
| EPON 828 | Diglycidyl ether of bisphenol A, obtained from Momentive Specialty Chemicals, Houston, TX |

-continued

| Designation | Description |
|---|---|
| JEFFAMINE D-230 | A difunctional, primary amine with an average molecular weight of 230, obtained from Huntsman Corporation, The Woodlands, TX |

Method for Making the Transfer Articles

To make the transfer article, a polyethylene coated paper substrate was heated to a temperature of about 140° C. to soften and make its surface tacky. Transparent microspheres were sprinkled over the polyethylene coated side of the heated polyethylene coated paper substrate forming a monolayer coating of transparent microspheres (on the polyethylene coated side of the substrate). The transparent microspheres were partially embedded in the polyethylene coating side of the polyethylene coated paper substrate to a depth equivalent of about 30-40% of their diameter. The degree to which the transparent microspheres were embedded in the polyethylene could be controlled by varying the temperature and the heating time of the polyethylene coated paper substrate.

Method I for Making the Microsphere Articles

A polyurethane binder composition was prepared by mixing 11 grams of K-FLEX 188, to which 5 wt. % of a carbon black pigment (obtained from PennColor, Inc., Doylestown, PA) was added, and 10 grams of DESMODUR N 3300A to which 1 drop of K-KAT XC-9213 was added.

The resulting polyurethane mixture was then coated on the above transfer article over the transparent microspheres, (thickness of the polyurethane coating was about 125 µm) and allowed to cure at 70° C. for 1 hour. Samples were removed from the oven and the liner comprising the polyethylene coated paper substrate was peeled off to form and expose the microsphere article.

Method II for Making the Microsphere Articles

A epoxy binder composition was prepared by mixing 10 grams of EPON 828 resin and 5.2 grams of JEFFAMINE D-230 curative. The resulting mixture was coated on the above transfer article over the transparent microspheres, (thickness of the epoxy coating was 150 microns) and allowed to cure at 85° C. for 1 hour. Samples were removed from the oven and the liner comprising the polyethylene coated paper substrate was peeled off to form and expose the microsphere article. Final cure was then achieved by exposing the microsphere article to 120° C. for 2 hours.

The microsphere articles were spray painted on the surface opposite the embedded microspheres using a black paint available under the trade designation "RUST-OLEUM FLAT SPRAY PAINT" (Rust-Oleum Corp., Vernon Hills, IL).

Refractive Index Measurement (Becke Line Method)

A set of certified refractive index test liquids available from Cargille of Cedar Grove, New Jersey were used to determine the refractive index of the transparent microspheres using the procedure described below.

A sample of the transparent microspheres were placed on a microscope slide and a drop of test liquid is contacted with the sample and covered with a cover slip. The microscope was adjusted to focus on the beads. At focus, the stage of the microscope is lowered using the focus and the bright line at the outline of the microsphere is observed as the focus was changed. If the bright line travels outward into the liquid as the stage is lowered, then the liquid had a higher index of refraction than the bead. If, on the other hand, the bright line travels into the bead, then the microsphere had the higher index of refraction. By testing a series of liquids of different index the approximate index of the microsphere was identified. If two liquids lie on either side of the index of refraction of the microsphere then an interpolation of the true number was made.

Refractive Index of Polyurethane Binder Composition Used in Method I

A polyurethane binder composition was prepared as described in the Method I for Making the Microsphere Articles (above) except that the carbon black pigment was not added. The resulting polyurethane mixture was coated onto a release liner and cured at 70° C. for 1 hour. The release liner was removed and the resulting film was tested for its refractive index using the Becke Line Method (above). The resulting polyurethane film had a refractive index of 1.502.

Refractive Index of Epoxy Binder Composition Used in Method II

The calculated refractive index of the resulting epoxy film used in Method II was determined using known refractive indices of the starting materials. The refractive index was calculated to be 1.542.

Method of Measuring Color and Luminosity

Color and luminosity (CIE L*, a*, b* values) of the microsphere articles prepared as described above were determined using a spectrophotometer (such as one commercially available under the trade designation "HunterLab MiniEZ", obtained from Hunter Associates Labs Inc., Reston VA) under conditions of 45/0 directional illumination. Samples were also examined visually (by naked eye) and perceived color was noted.

Example 1 (EX1)

EX1 microsphere article and the transfer article were prepared using the Method I for Making the Microsphere Articles described above. The transparent microspheres were borosilicate glass microspheres with an average size of 44-53 µm (obtained from Mo Sci, Inc., Rolla, MO) with a refractive index of 1.46 as determined by the Becke Line method. The transparent microspheres were sprinkled over a polyethylene coated paper substrate and heated to about 140° C., to form a monolayer of transparent microspheres wherein the microspheres were embedded into the polyethylene layer about 30-40% of their diameter. After the black pigmented polyurethane coating (125 µm thick) was applied over the microsphere coated paper and cured by placing in an oven at 70° C. for 1 hour, the liner comprising the polyethylene coated paper substrate was removed to form a free standing black film containing partially exposed microspheres.

Color and luminosity (CIE L*, a*, b* values) of the EX1 microsphere article was determined as described above.

Comparative Example 1 (CE1)

CE1 microsphere article and transfer articles were prepared in the same manner as EX1, except that the transparent microspheres were soda-lime-silicate microspheres with an average size of about 44-53 µm (obtained from Swarco Industries, Inc., Columbia, TN). The refractive index of the transparent microspheres was measured to be 1.52 using the Becke Line method.

Color and luminosity (CIE L*, a*, b* values) of the CE1 microsphere article was determined as described above.

Example 2 (EX2)

EX2 microsphere article and the transfer article were prepared using the Method I for Making the Microsphere Articles described above.

The transparent microspheres were borosilicate glass microspheres with an average size of less than 63 μm and with a refractive index of 1.458 as determined using the Becke Line Method. The above transparent borosilicate glass microspheres were prepared by spherodizing recycled borosilicate glass feed particles (obtained from Strategic Materials, Houston TX), through a $H_2/O_2$ flame at a rate of approximately 3 grams per minute. The resulting spherodized particles were collected in a steel container, metallic impurities were removed using a magnet and processed through the $H_2/O_2$ flame for a second time to improve their purity and homogeneity.

The transparent microspheres were sprinkled over a polyethylene coated paper substrate heated to about 140° C., to form a monolayer of transparent microspheres wherein the microspheres were embedded into the polyethylene layer about 30-40% of their diameter. After the black pigmented polyurethane coating (125 μm thick) was applied over the microsphere coated transfer article and cured by placing in an oven at 70° C. for 1 hour, the liner comprising the polyethylene coated paper substrate was stripped to form a free standing black film containing partially exposed microspheres.

Color and luminosity (CIE L*, a*, b* values) of the EX2 microsphere article was determined as described above.

Comparative Example 2 (CE2)

CE2 microsphere article and transfer articles were prepared in the same manner as EX2, above except that the transparent microspheres were calcium aluminosilicate microspheres with an average size of about 30-75 μm and a refractive index of 1.61 as determined using the Becke Line method. The transparent calcium aluminosilicate microspheres were prepared by feeding calcium aluminosilicate granules through a $H_2/O_2$ flame at a rate of approximately 3 grams per minute. The resulting spherodized particles were collected in a steel container and processed through the $H_2/O_2$ flame for a second time to improve their homogeneity.

The transparent microspheres were sprinkled over a polyethylene coated paper substrate and heated to about 140° C., to form a monolayer of transparent microspheres wherein the microspheres were embedded into the polyethylene layer about 30-40% of their diameter. After the black pigmented polyurethane coating (125 μm thick) was applied over the microsphere-coated paper substrate and cured by placing in an oven at 70° C. for 1 hour, the liner comprising the polyethylene coated paper substrate was removed to form a free standing black film containing partially exposed microspheres.

Color and luminosity (CIE L*, a*, b* values) of the CE2 microsphere article was determined as described above.

Comparative Example 3 (CE3)

A coating of black pigmented polyurethane binder composition described above was applied over a microreplicated dimpled polyethylene surface (dimple size~30 μm) and cured in an oven at 70° C. for 1 hour. The black pigmented polyurethane coating was about 125 μm thick. The polyethylene carrier was then stripped to reveal a low gloss black film.

The Table 1, below summarizes the properties of Example 1, 2 and Comparative Examples 1-3. Note that the refractive index mismatch is the difference between the refractive indices of the microsphere and the binder for corresponding sample.

TABLE 1

| Sample | Refractive Index | | | Pigment | Perceived Color | Color | | |
|---|---|---|---|---|---|---|---|---|
| | Binder | Microsphere | Difference | | | L* | a* | b* |
| EX1 | 1.502 | 1.460 | 0.042 | black | black-gray | 12.59 | −0.18 | −1.08 |
| EX2 | 1.502 | 1.458 | 0.043 | black | black | 10.86 | 0.06 | −0.18 |
| CE1 | 1.502 | 1.520 | −0.018 | black | dark gray | 15.21 | −0.02 | −0.05 |
| CE2 | 1.502 | 1.650 | −0.148 | black | dark gray | 15.41 | −0.01 | −0.36 |
| CE3 | 1.502 | 1.502 | 0 | black | dark gray | 15.545 | 0.07 | −0.05 |

Example 3 (EX3)

EX3 was prepared using Method II for Making the Microsphere Articles described above.

The transparent microspheres were borosilicate glass microspheres with an average size of less than 63 μm and with a refractive index of 1.458 as determined using the Becke Line Method. The above transparent borosilicate glass microspheres were prepared by spherodizing recycled Type 1 borosilicate glass feed particles (obtained from Strategic Materials, Houston TX), through a $H_2/O_2$ flame at a rate of approximately 3 grams per minute. The resulting spherodized particles were collected in a steel container, metallic impurities were removed using a magnet and processed through the $H_2/O_2$ flame for a second time to improve their purity and homogeneity.

The transparent microspheres were sprinkled over a polyethylene coated paper substrate heated to about 140° C., to form a monolayer of transparent microspheres wherein the microspheres were embedded into the polyethylene layer about 30-40% of their diameter. After the epoxy coating (150 μm thick) was applied over the microsphere embedded polyethylene coated paper substrate, the substrate was cured in an oven at 85° C. for 1 hour. Afterwards, the liner comprising the polyethylene coated paper substrate was removed to form a free standing clear film containing partially exposed microspheres. Final cure was achieved by exposing the microsphere article to 120° C. for 2 hours. The back side of the microsphere article was then spray painted black as described above.

Color and luminosity (CIE L*, a*, b* values) of the EX3 microsphere article was determined as described above.

Example 4 (EX4)

EX4 was prepared using Method II for Making the Microsphere Articles described above.

The transparent microspheres were '51 expansion borosilicate' glass microspheres with an average size of less than 63 μm and with a refractive index of 1.470 as determined using the Becke Line Method. The transparent borosilicate glass microspheres were prepared by spherodizing milled borosilicate glass feed particles (prepared by disc milling '51 expansion borosilicate' glass tubing obtained from Gerresheimer, Vineland, NJ), through a $H_2/O_2$ flame at a rate of approximately 3 grams per minute. The resulting spherodized particles were collected in a steel container.

The transparent microspheres were sprinkled over a polyethylene coated paper substrate and heated to about 140° C., to form a monolayer of transparent microspheres wherein the microspheres were embedded into the polyethylene layer about 30-40% of their diameter. After the epoxy coating (150 μm thick) was applied over the microsphere coated transfer article and cured by placing in an oven at 85° C. for 1 hour, the liner comprising the polyethylene coated paper substrate was removed to form a free standing clear film containing partially exposed microspheres. Final cure was achieved by exposing the microsphere article to 120° C. for 2 hours. The back side of the microsphere article was then spray painted black as described above.

Color and luminosity (CIE L*, a*, b* values) of the EX3 microsphere article was determined as described above.

Comparative Example 4 (CE4)

CE4 microsphere article and transfer articles were prepared in the same manner as EX4, except that the transparent microspheres were soda-lime-silicate microspheres with an average size of about 44-53 μm (obtained from Swarco Industries, Inc., Columbia, TN). The refractive index of the transparent microspheres was measured to be 1.520 using the Becke Line method.

Color and luminosity (CIE L*, a*, b* values) of the CE1 microsphere article was determined as described above.

Comparative Example 5 (CE5)

CE5 microsphere article and transfer articles were prepared in the same manner as EX4, except that the transparent microspheres were borosilicate E-glass microspheres with a particle size in the range of 20-75 μm (obtained from Potter's Industries, Malvern, PA). The microspheres were passed through a $H_2/O_2$ flame to improve their defect levels. The refractive index of the transparent microspheres was measured to be 1.57 using the Becke Line Method.

Color and luminosity (CIE L*, a*, b* values) of the CE1 microsphere article was determined as described above.

microspheres is exposed at the outermost surface of the article and wherein at least 70% by count of the transparent microspheres in the plurality of transparent microspheres are free of bubble defects;
wherein the plurality of transparent microspheres consists of microspheres having a refractive index of no more than 1.490, and
wherein the plurality of transparent microspheres consists of microspheres having a refractive index at least 0.042 less than the refractive index of the first binder layer.

2. The article of claim 1, wherein the first binder layer comprises at least one or more of the following: a polyurethane, a polyester, an acrylic acid ester polymer, an acrylic acid ester copolymer, a methacrylic acid ester polymer, a methacrylic acid ester copolymer, an epoxy, an elastomer, or a polymer matrix composite.

3. The article of claim 1, wherein the first binder layer is a polyurethane.

4. The article of claim 3, wherein the plurality of transparent microspheres consists of microspheres having a refractive index of no more than 1.480.

5. The article of claim 1, wherein the first binder layer is an epoxy.

6. The article of claim 1, where in the first binder layer is an adhesive.

7. The article of claim 1, wherein up to about 91% of the surface of the article is covered with the plurality of transparent microspheres.

8. The article of claim 1, wherein at least one of the article or the binder layer comprises a pigment.

9. The article of claim 1, which further comprises one or more layers selected from the group consisting of substrate layers, adhesive layers, colored polymeric layers, and release layers bonded to the article on a side of the first binder layer opposite the plurality of transparent microspheres, wherein any of said layers can optionally have a graphic design therein.

10. The article of claim 9, wherein the substrate layer comprises at least one or more of the following: a fabric, a polymer coated fabric, leather, a metal, a paint coated metal, an elastomer, paper, a polymer matrix composite, or a polymeric material.

11. The article of claim 1, wherein the refractive index difference between the transparent microspheres and the first binder layer is at least 0.02.

12. The article of claim 1, wherein the refractive index difference between the transparent microspheres and the first binder layer is at most 0.05.

TABLE 2

| Sample | Refractive Index | | | Paint applied | Color | | |
|---|---|---|---|---|---|---|---|
| | Binder | Microsphere | Difference | | L* | a* | b* |
| EX3 | 1.542 | 1.458 | 0.083 | black | 18.67 | 0 | −0.28 |
| EX4 | 1.542 | 1.470 | 0.072 | black | 18.21 | −0.08 | −0.26 |
| CE4 | 1.542 | 1.520 | 0.022 | black | 21.28 | −0.05 | −0.21 |
| CE5 | 1.542 | 1.570 | −0.028 | black | 21.56 | −0.09 | −0.12 |

What is claimed is:

1. An article comprising at least a first surface having:
(a) a first binder layer;
(b) a plurality of transparent microspheres partially embedded in the first binder layer such that about 20% to about 70% of the average diameter of the transparent 13. The article of claim 1, wherein the plurality of transparent microspheres consists of microspheres having a refractive index of no more than 1.470.

14. The article of claim 1, wherein the plurality of transparent microspheres consists of microspheres having a refractive index of no more than 1.40.

15. The article of claim 1, wherein the transparent microspheres exposed at the outermost surface of the article are in contact with air.

16. The article of claim 1, wherein the article is free of a reflecting layer.

17. The article of claim 1, wherein the refractive index of the first binder layer is greater than 1.50.

18. The article of claim 1, wherein the plurality of transparent microspheres consists of microspheres having a refractive index of 1.45 to 1.47.

19. The article of claim 1, wherein the plurality of transparent microspheres consists of spherical glass beads.

20. The article of claim 1, wherein the plurality of transparent microspheres consists of borosilicate glass.

21. The article of claim 1, wherein the transparent microspheres have refractive indices that are less than a refractive index of the first binder layer.

* * * * *